United States Patent
Steinhilber

(10) Patent No.: US 7,800,860 B2
(45) Date of Patent: Sep. 21, 2010

(54) DEVICE FOR STORING DATA CARRIERS

(75) Inventor: Friedhelm Steinhilber, Rottweil (DE)

(73) Assignee: BDT AG, Rottweil (DE)

( * ) Notice: Subject to any disclaimer, the term of this patent is extended or adjusted under 35 U.S.C. 154(b) by 963 days.

(21) Appl. No.: 11/565,924

(22) Filed: Dec. 1, 2006

(65) Prior Publication Data

US 2007/0147192 A1 Jun. 28, 2007

(30) Foreign Application Priority Data

Dec. 1, 2005 (DE) .................. 10 2005 057 678

(51) Int. Cl.
*G11B 21/08* (2006.01)
*G11B 7/085* (2006.01)

(52) U.S. Cl. ............. 360/92.1; 369/30.42; 369/30.43

(58) Field of Classification Search ............. 360/92.1; 369/30.42, 30.43, 30.48, 30.67, 30.68, 30.69; 720/614, 615

See application file for complete search history.

(56) References Cited

U.S. PATENT DOCUMENTS

| | | | | |
|---|---|---|---|---|
| 5,128,912 A | * | 7/1992 | Hug et al. ............. | 369/30.61 |
| 5,818,723 A | * | 10/1998 | Dimitri ................ | 700/214 |
| 5,847,897 A | * | 12/1998 | Marlowe ............... | 360/92.1 |
| 6,353,851 B1 | | 3/2002 | Anupam et al. ......... | 709/204 |
| 6,553,456 B2 | * | 4/2003 | Tadokoro et al. ....... | 711/112 |
| 6,580,582 B1 | * | 6/2003 | Caverly ............... | 360/92.1 |
| 6,819,525 B2 | * | 11/2004 | Brace et al. .......... | 360/92.1 |
| 6,848,114 B2 | * | 1/2005 | Mueller et al. ........ | 720/647 |
| 7,292,405 B2 | * | 11/2007 | Brace et al. .......... | 360/92.1 |
| 2005/0163022 A1 | | 7/2005 | Kawasaki .............. | 382/154 |
| 2005/0219964 A1 | * | 10/2005 | Pollard et al. ........ | 369/30.27 |

FOREIGN PATENT DOCUMENTS

DE 102005002994 A1 8/2005
EP 1251504 A2 10/2002

* cited by examiner

*Primary Examiner*—Brian E Miller
(74) *Attorney, Agent, or Firm*—King & Spalding L.L.P.

(57) ABSTRACT

A device for storing data carriers has a housing (10). In the housing (10) magazines (12) can be inserted, which accommodate data carriers, e.g. magnetic tape cartridges (26) lying flat. In order to be able to exchange cartridges (26) without moving the magazine (12) out of the housing (10) and without interrupting the operation of the device, end-sided receptacles of the magazines (12) are designed as a changing device (28), which is mounted as a drawer in the associated magazine (12) and which, in the case of the inserted magazine (12), can be extended out of this magazine (12) and out of the housing (10).

20 Claims, 7 Drawing Sheets

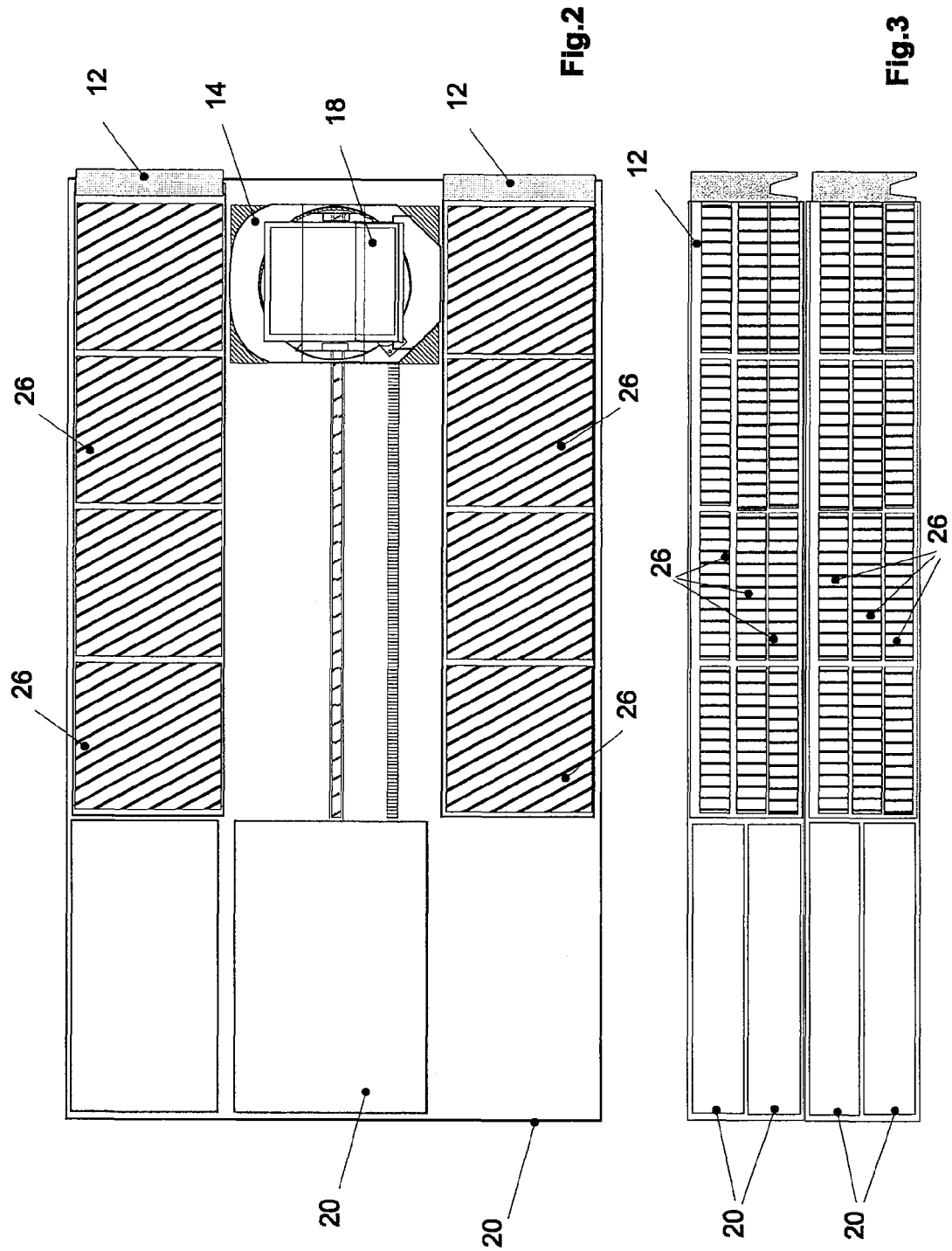

DEVICE FOR STORING DATA CARRIERS

RELATED APPLICATION

This application claims priority from German Patent Application No. DE 10 2005 057 678.8, which was filed on Dec. 1, 2005, and is incorporated herein by reference in its entirety.

TECHNICAL FIELD

The invention relates to a device for storing data carriers such as magnetic tape cartridges, magnetic discs or optical discs(CD, DVD).

BACKGROUND

In order to store large quantities of data, the data are recorded on data carriers, e.g. on magnetic tape cartridges, magnetic discs or optical plates (CD, DVD). In order to store a large number of such data carriers and to be able to access them, devices are used which are known under the designation 'library' or 'autoloader'. A large number of data carriers are disposed in corresponding receptacles in these devices and can be removed from and inserted into the respective receptacles by means of a robot unit. In this way, the data carriers can be selectively released or transferred to a drive arranged in the device or inversely reinserted into a selected receptacle.

In such devices, which can accommodate a large number of data carriers, it is known to arrange the receptacles for several data carriers in a common magazine, which can be removed from the housing of the device. Data carriers, to which a current access is not necessary, can thus be archived in an orderly manner in the magazines. Likewise, it is thus possible to exchange a large number of data carriers disposed in a magazine jointly and to equip the magazines outside the device with the data carriers thereby simplifying and reducing the time required for changing the data carriers available for access in the device.

A device for storing data carriers of the type mentioned at the onset is known from U.S. Pat. No. 6,353,581 B1. In this device, the last receptacle of at least one magazine is designed as a change receptacle. This change receptacle is accessible from the outer side of the housing of the device so that a data carrier can be removed from or inserted into this change receptacle without having to remove the entire magazine from the housing. The resulting advantage is that a single data carrier can be exchanged without having to interrupt the operation of the device since the remaining receptacles of the magazine remain in their operating position and are accessible to the robot unit. The change receptacle thus serves as the mailbox, using which individual data carriers can be removed from or inserted into the device during the operation of the latter, the robot unit carrying out the internal transport of the data carriers between the change receptacle and the remaining receptacles.

In the device known from U.S. Pat. No. 6,353,581 B1, the data carriers, namely magnetic tape cartridges, are arranged in the receptacles of the magazine edgewise side by side, i.e. with their flat sides adjoining to one another. The change receptacle is located such that its flat side adjoins to the vertical panel of the housing of the device. The change receptacle can swivel about an axis that is parallel to the vertical front panel of the housing so that the receptacle can be extended from the front side of the housing in order to exchange the data carrier in the change receptacle. The edgewise vertical arrangement of the data carriers, particularly of magnetic tape cartridges, in the magazines requires a relatively large minimum installation height of the device. The space taken up by the device frequently plays an essential role in the case of a smaller and average data storage requirement. Since the device is inserted into a standardized rack in most applications, the installation height is the essential criterion for the space utilized.

SUMMARY

The object underlying the invention therefore is to design a device of the type mentioned at the onset such that the smallest installation height possible is required.

A device for storing data carriers may comprise a housing comprising at least one magazine, receptacles arranged in the magazine, each of said receptacles being used for a data carrier, wherein the data carriers are accommodated lying flat in the receptacles of the magazine, and a robot unit, designed to move in the housing and to be positioned in front of the receptacles of the at least one magazine, in order to remove the data carriers out of the receptacles or to insert them into the receptacles, and a changing device being arranged at the end of the at least of one magazine, the changing device being accessible from the outer side of the housing when the magazine is inserted, in order to remove a data carrier from this changing device and/or to insert a data carrier into this changing device, wherein the changing device is designed as a drawer, which is mounted in the magazine with at least one receptacle and which, in the case of the inserted magazine, can be extended out of the magazine and the housing in a plane parallel to that of the receptacles into a change position in which data carriers can be removed from and/or inserted into the housing.

Advantageous embodiments and improved developments of the invention are specified in the dependent claims.

BRIEF DESCRIPTION OF THE DRAWINGS

The invention is explained in detail in the following with reference to an exemplary embodiment illustrated in the drawing, of which:

FIG. 2 is a plan view of the device in its operating state,

FIG. 3 is. a lateral view of FIG. 2,

DETAILED DESCRIPTION

Figure 1:
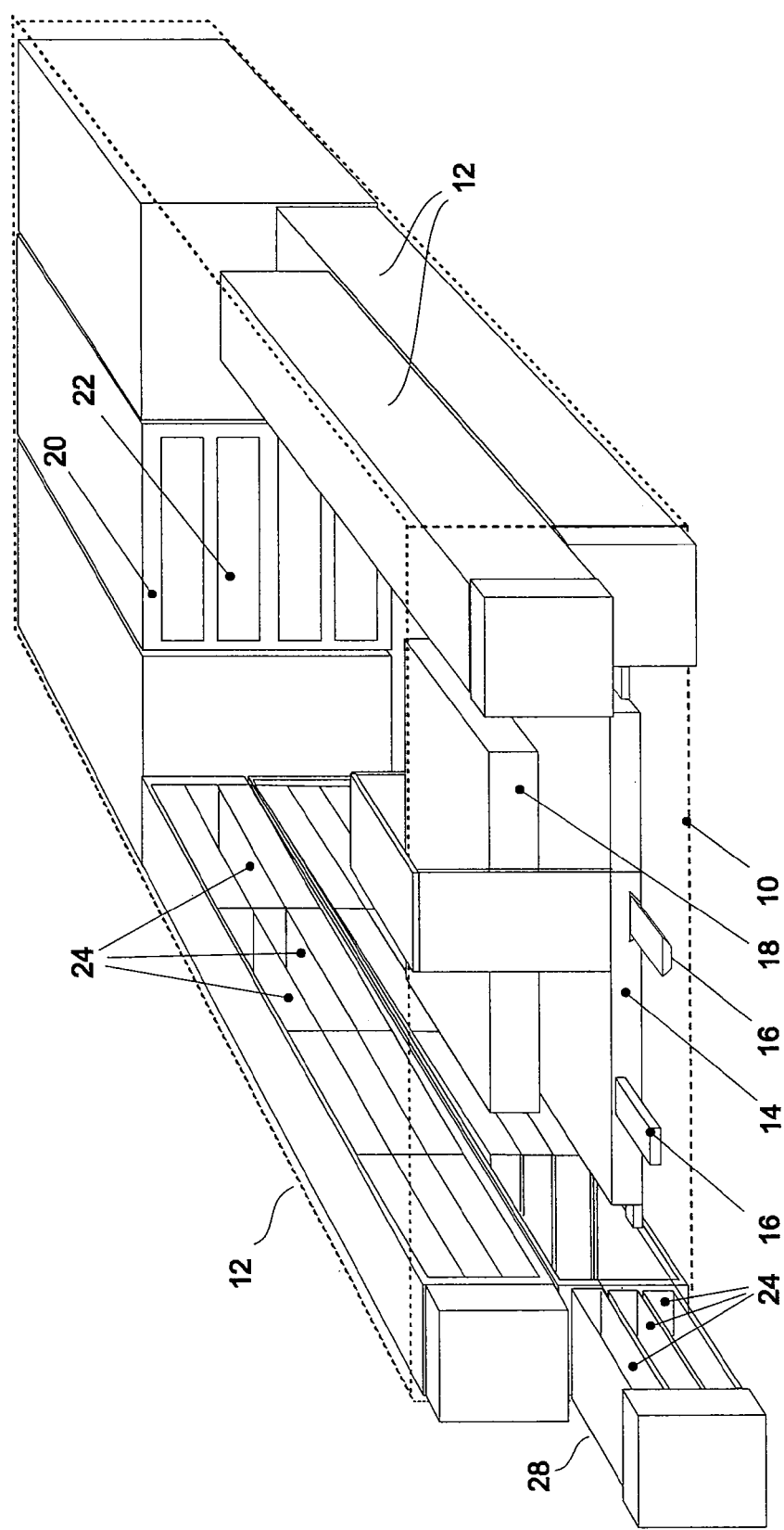
FIG. 1 is a schematic illustration of an isometric view of the device.

In the device according to an embodiment, the magazines are designed such that the data carriers are arranged lying flat in the receptacles. Thus the data carriers are located in the receptacles in a common plane with their lateral edges adjoining to one another. Naturally, several levels of receptacles can also be arranged on top of one another in parallel in a magazine. In this arrangement of the receptacles, the openings of the receptacles are therefore located in a plane, which runs perpendicularly to the plane of the vertical wall of the housing. Accordingly, the magazine is also pulled out of the housing for changing purposes in a plane that is parallel to that of the receptacles.

According to an embodiment, in order to fulfill the mailbox function and to take out individual data carriers from or insert them into the device without interrupting the operation, at least one magazine of the device is designed with a changing device. According to an embodiment, the changing device has the shape of a drawer, which is mounted displaceably in the magazine and comprises at least one receptacle. When the magazine is inserted, this drawer can be pulled out of the magazine and thus out of the side wall, preferably the front side wall, of the housing in a plane that is parallel to that of the receptacles. Thus the at least one receptacle of the changing device lies exposed on the outer side of the housing so that a data carrier present in the receptacle can be removed and/or a new data carrier can be inserted into the receptacle. Since only the drawer of the changing device is pulled out of the magazine for this purpose, the entire magazine with the remaining receptacles remains in its operating position in the housing and can be operated by the robot unit in an undisturbed manner. According to an embodiment, the robot also takes up the transport of the data carriers between the changing device and the remaining parts of the device when the changing device is inserted into the magazine. In this inserted position, the at least one receptacle of the changing device is accessible to the robot unit just as the remaining receptacles so that, for example, a data carrier can be brought by the robot unit from any receptacle of the device into the changing device in order to be discharged from the device or a new data carrier inserted into the changing device can be deposited by the robot unit in the receptacle of any storage space.

According to an embodiment, the drawer of the changing device is preferably lockable in the inserted position in the magazine. In doing so, the robot unit, in particular, can also be used for unlocking the locking mechanism. The locking mechanism can be thus arranged inside the housing of the device, the unlocking action being carried out by activating the robot unit. This enables a simple operation of the changing device while simultaneously preventing an accidental unlocking.

According to an embodiment, the number and design of the changing devices can be selected depending on the design of the entire device and the magazines. In a design having minimum installation height of 1U (U =1.75 inch), the magazines are designed only with one level of receptacles. Accordingly, the changing device has only one receptacle. In the case of an installation height of 2U, magazines having three levels of receptacles, said levels being arranged on top of one another are possible. The changing device can have only one receptacle so that a change of the data carrier is possible only in one level of the magazine. Likewise it is possible to design the changing device with two or preferably three receptacles arranged on top of each other. In the case of a larger storage capacity and accordingly larger installation height of, for example, 4U or 8U, several magazines are also usually arranged on top of one another, each of which then preferably comprises three levels of receptacles. Here, in each case, only one magazine can be designed with a changing device or several or all the magazines can be designed with one changing device. Frequently the robot unit can move between two magazines or magazine stacks facing one another. In this case, it is further possible to provide one or more changing devices only in magazines located on one side or also in magazines located on both the sides.

According to an embodiment, the entire magazine is also preferably locked in the housing. Here also, the robot unit can be used advantageously for unlocking the locking mechanism of the magazine if the entire magazine is supposed to be removed and changed.

The device comprises a housing 10, which is indicated in dashed form in FIG. 1 and which is preferably designed as a flat cuboid and the width and depth of which is dimensioned for installation in a standardized rack. The height of the housing 10 is selected according to the number of the data carriers to be accommodated. In the exemplary embodiment illustrated, the data carriers are magnetic tape cartridges.

In the view, shown in FIG. 1, of the vertical front side, magazines 12 are disposed on the left side and on the right side in the housing 10. The magazines 12 are arranged perpendicularly to the vertical front side of the housing 10, a middle open space remaining between the left and the right magazines 12. In this open space there is arranged a robot unit 14, which can move between the magazines 12 and parallel to the latter, for which purpose the robot unit 14 can be driven on guides and rack rails 16, which are arranged on the base of the housing and parallel to the magazines 12. The robot unit 14 comprises a gripper device 18, the height of which can be adjusted in a controlled manner and which can swivel in its horizontal plane. By moving the robot unit 14 on the guide 16, adjusting the height of the gripper device 18 and swiveling the gripper device 18, the gripper device can be moved in a controlled manner in front of each selected receptacle both of the right and the left magazines 12 in order to remove a cartridge from or insert it into the receptacle.

One or more function units 20, e.g. drives for the data carriers are disposed on the rear side of the housing 10. The function units 20 are each disposed on the rear front side of the open space between the magazines 12 and comprise receiving slots 22 facing this open space. The robot unit 14 can remove data carriers, i.e. magnetic tape cartridges, from the receptacle of any activated storage space by means of the gripper device 18, transport them to a selected function unit 20 and insert them into the receiving slots 22 thereof. Likewise, cartridges can be removed from the function units 20 and deposited in the receptacle of any storage space. Finally, cartridges can also be transported between the receptacles of different storage spaces.

In the illustrated exemplary embodiment having an installation height of 4U, two magazines 12 are each located on top of one another on the left and the right side in the housing 10. Each of these magazines 12 comprises receptacles 24 in three horizontal levels arranged in parallel on top of one another, said receptacles being intended for data carriers, particularly magnetic tape cartridges 26. The receptacles 24 of the magazines 12 each have a receiving slot, which is open towards the middle open space and in which the cartridges 26 can be inserted or from which cartridges 26 can be removed by means of the robot unit 14. In each level there are four receptacles 24, which are attached to one another horizontally and vertically relative to the front side. The cartridges 26 are thus accommodated lying flat in the horizontal plane in the receptacles 24. In the exemplary embodiment illustrated, each level of the magazine 12 thus accommodates four cartridges 26. A magazine 12 having three levels located on top of one another can thus accommodate twelve cartridges 26. In the case of two magazines 12 on the left side and two magazines 12 on the right, the resulting storage capacity of the device is forty-eight cartridges 26. It is obvious that in the case of a smaller storage capacity, only one magazine 12 can be provided on each of the two sides, thus resulting in a flatter design of the housing 10 and thus of the device. If a larger storage capacity is required, then other magazines can be added on in the housing on the right and on the left side or other housings 10 with additional magazines 12 can be mounted wherein preferably only the lowermost of several devices stacked on top of one another has to be equipped with a robot unit 14, if the gripper device 18 thereof can be adjusted in height so as to be able to also move into the housing located on top of it. It is likewise obvious that magazines 12 need not be arranged on both the sides of the housing 10. Magazines 12, along which the robot unit 14 moves, can be provided on one side only.

The magazines 12 are inserted removeably into the housing 10 and can be inserted into the housing 10 horizontally from the front side. In the FIGS. 2 and 3 all the magazines 12 are inserted into the housing 10 and are locked in the housing 10 in a manner that is explained later. The robot unit 14 with the gripper device 18 can thus move toward all the receptacles 24 of the magazines 12 in a controlled manner in order to remove cartridges 26 from the selected receptacles 24 or in order to insert cartridges into the latter.

Figure 4:
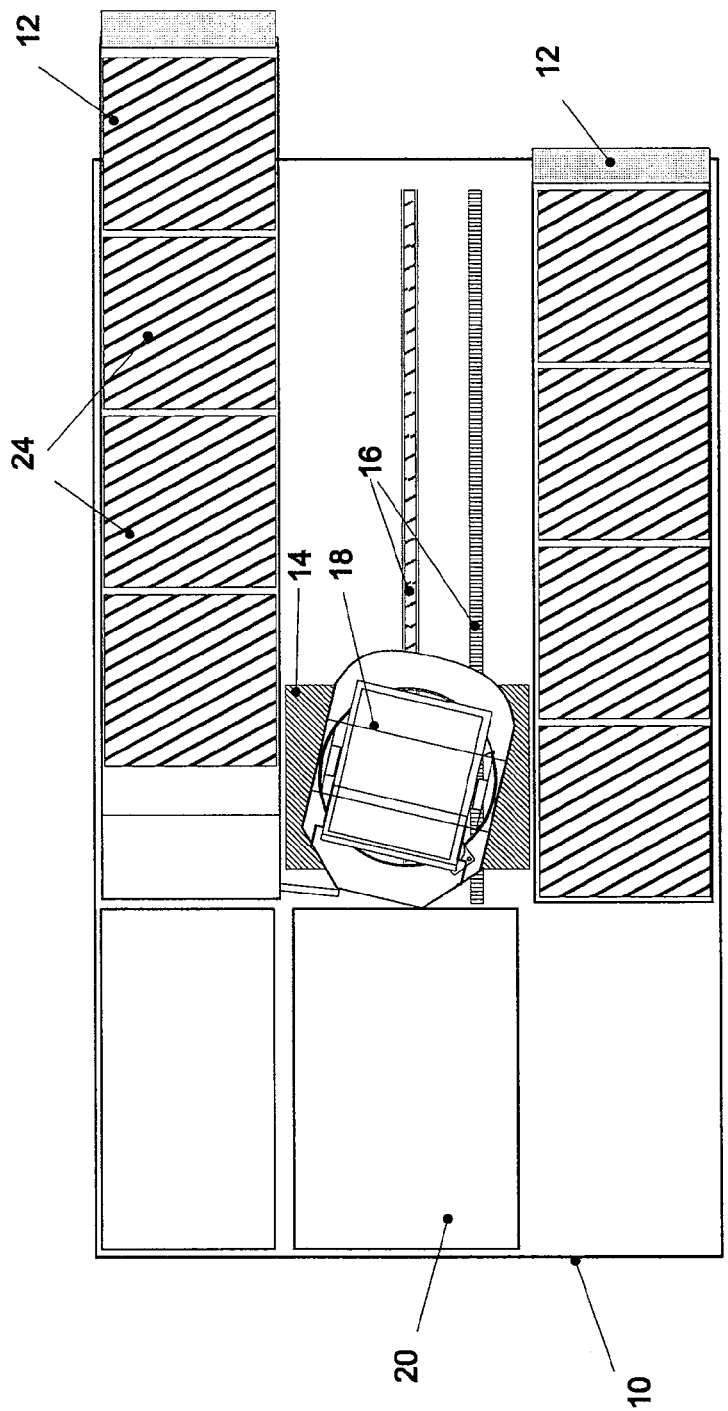
FIG. 4 is a plan view corresponding to FIG. 2 with the magazine pulled out.
Figure 5:
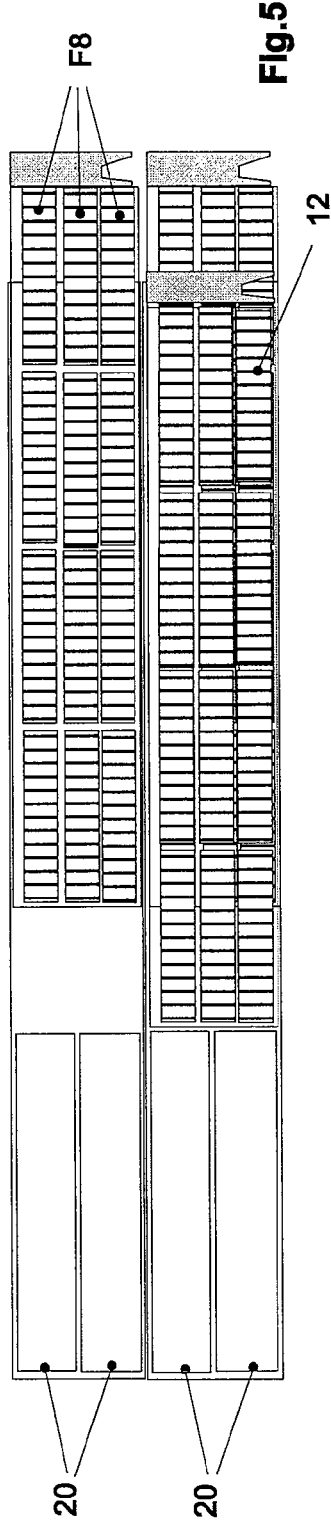
FIG. 5 is a lateral view of FIG. 4.

FIGS. 4 and 5 illustrate the manner in which the individual magazines 12 can be taken out of the housing. In the FIGS. 4 and 5, for example, the upper magazine 12 on the right side is pulled out of the housing 10. If data, which must be archived for a longer period of time without there being any need to access these data in the short term, are stored on the data carriers, then the magazine with the corresponding data carriers can be removed and mounted externally. Instead of the archived magazine 12, another magazine 12 is inserted which accommodates data carriers to which an access is currently necessary.

Figure 6:
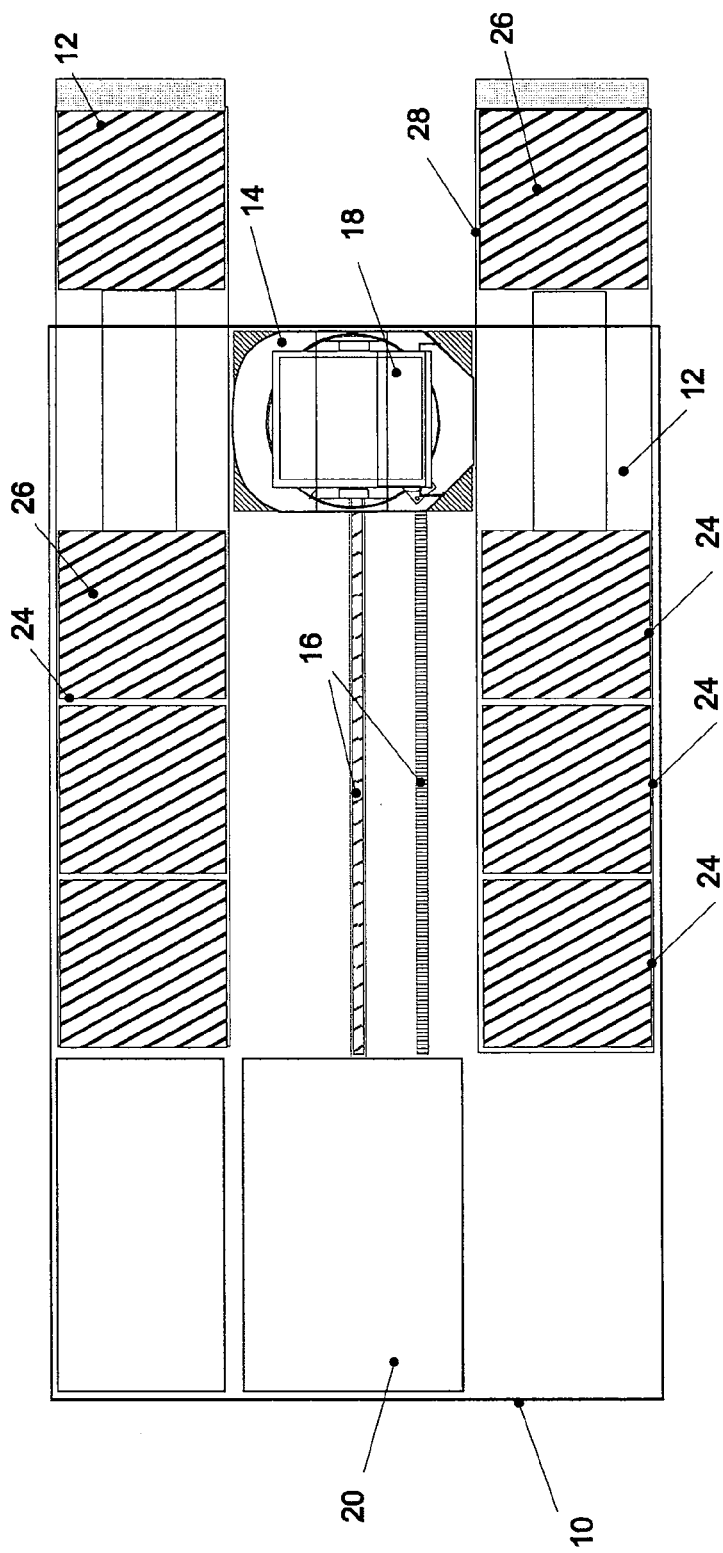
FIG. 6 is a plan view corresponding to FIG. 2 with an extended change receptacle.
Figure 7:
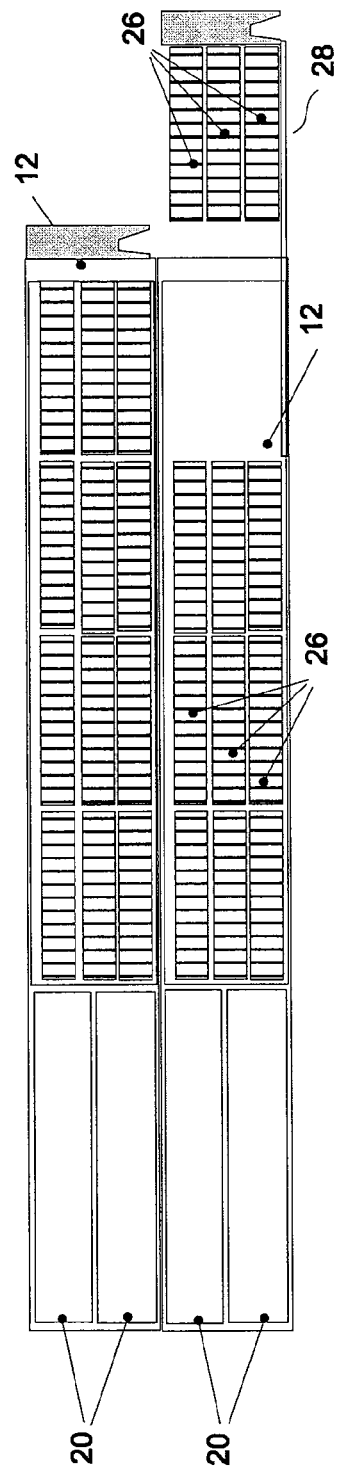
FIG. 7 is a lateral view of FIG. 6.

FIGS. 6 and 7 illustrate the manner in which individual cartridges 26 can be removed from and/or inserted into the device without requiring the respective magazine 12 to be pulled out of the housing 10 for this purpose.

For this purpose, at least one magazine 12, or even several or all the magazines 12, where appropriate, have a changing device 28. This changing device 28 is in the position of one or more receptacles 24, which are at the front-sided end of the respective magazine 12. In the exemplary embodiment of the FIGS. 6 and 7, the changing device 28 is illustrated correspondingly to the design of the magazines 12 with three receptacles located on top of one another. The changing device 28 is designed as a drawer, which can be pulled out of the magazine 12 and thus from the vertical front side of the housing 10 in the plane of the receptacles 24 horizontally from the front side, as shown in the FIGS. 6 and 7. In this position, cartridges 26 can be removed from the receptacles 24 of the changing device 28 and/or cartridges can be inserted into the free changing device 28. If the changing device 28 is inserted again into the magazine 12 from the change position shown in the FIGS. 6 and 7, the changing device 28 is again in an operating position in the magazine 12 in which its receptacles are accessible to the gripper device 18 of the robot unit 14, as illustrated in the FIGS. 2 and 3. In order to exchange a cartridge 26 deposited in any receptacle 24 of one of the magazines 12, this cartridge is collected from its receptacle by means of the robot unit 14 and is brought into the changing device inserted into the magazine 12 and inserted in the receptacle thereof. Now the changing device 28 is extended into the change position illustrated in FIGS. 6 and 7 and the cartridge can be removed from the changing device 28 and another cartridge 26 can be inserted into the changing device 28. Subsequently, the changing device 28 is inserted again into the magazine 12 in the position illustrated in FIGS. 2 and 3. The cartridge 26 given in exchange can be collected from the changing device 28 by means of the robot unit 14 and deposited into the receptacle 24 of a selected storage space. When extending the changing device 28 and changing the cartridge 26, the positions of the associated magazine 12 and also of the remaining magazines 12 remain unchanged in the housing 10 so that the remaining receptacles 24 of this magazine 12 can retain their programmed position even when the changing device 28 is extended and can be approached by the robot unit 14. The operation of the device therefore need not be interrupted for changing a cartridge by means of the changing device 28.

Figure 8:
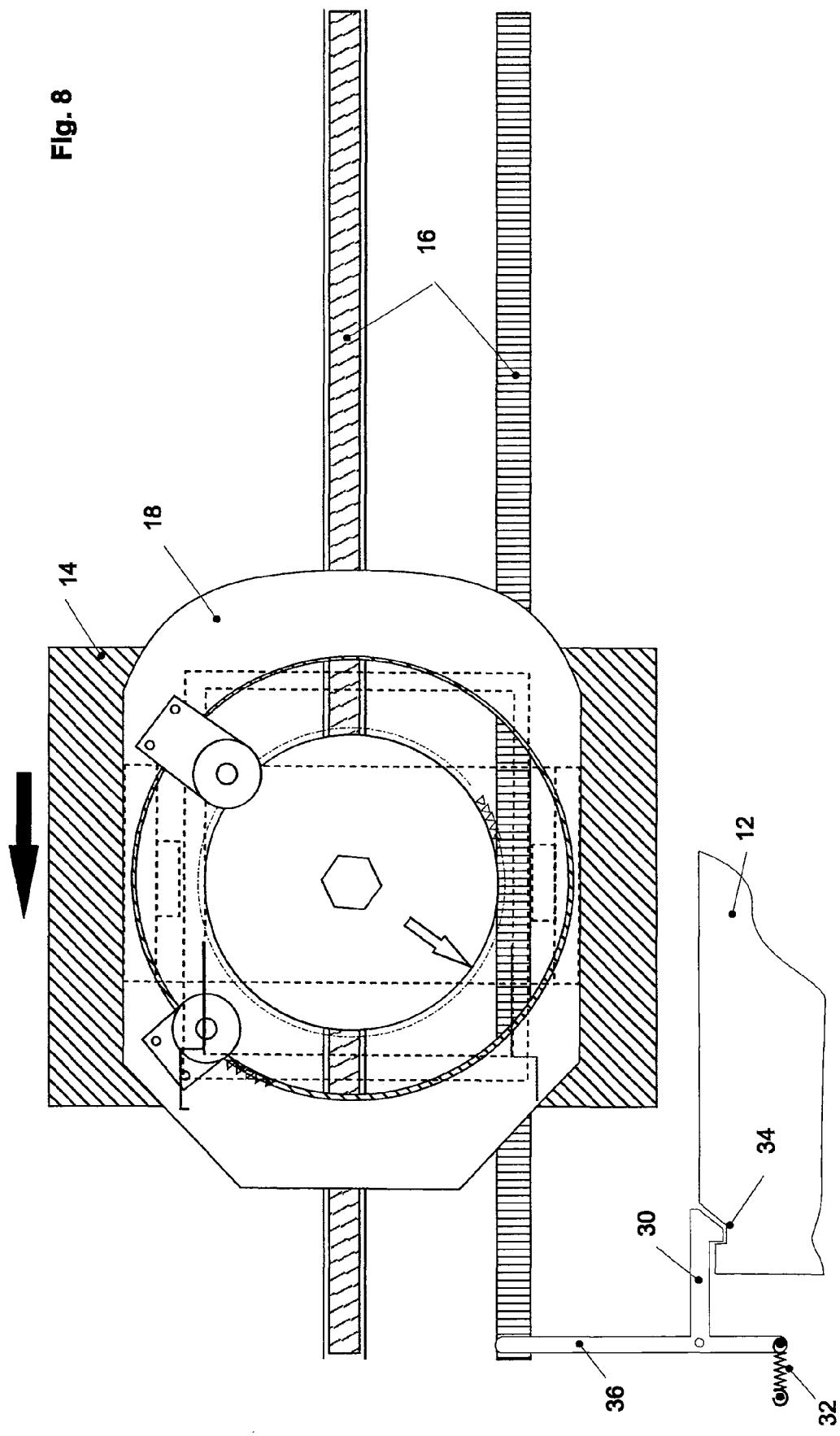
FIG. 8 is a plan view of the locking mechanism of a magazine.
Figure 9:
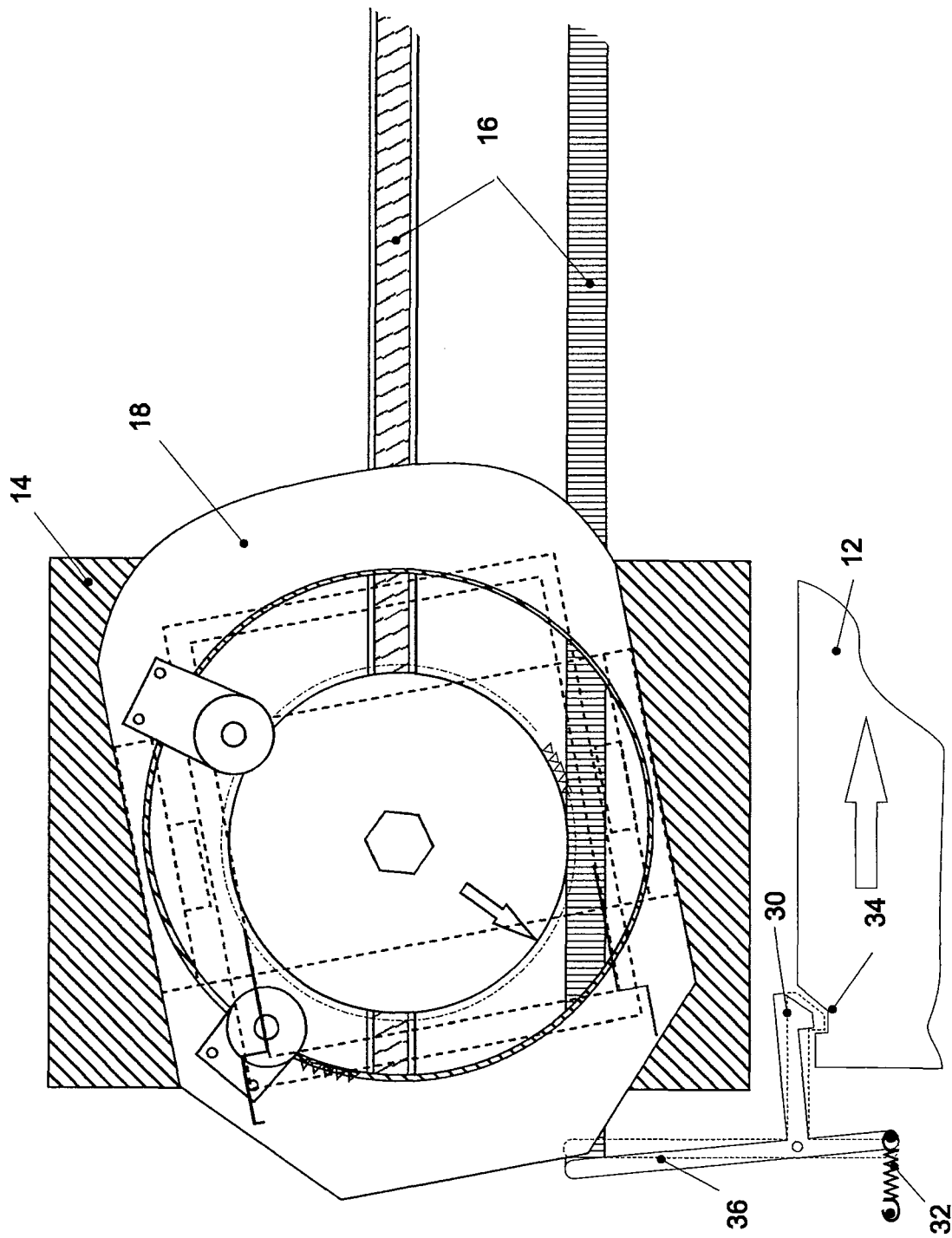
FIG. 9 is an illustration, corresponding to FIG. 8, of the unlocking mechanism of the magazine.

The magazines 12 inserted into the housing 10 are preferably locked in the housing 10. The FIGS. 8 and 9 show an exemplary embodiment for such a locking mechanism. At the rear end of the open space of the housing 10, when seen from the front side, snap arms 30 are arranged, which are mounted swivelably about a vertical axis and are pre-stressed by a spring 32. Such a snap arm 30 is assigned to each magazine 12. When the magazine. 12 is inserted into the housing 10, then the inner end of the magazine 12 hits against the snap arm 30 and swivels the snap arm 30 against the action of the spring 32, for which purpose the snap arm 30 is provided with a chamfer. The deflected snap arm 30 slides along the magazine 12 and snaps into position in a catching recess 34 of the magazine 12, by which the magazine 12 is kept locked in the housing 10. This is illustrated in FIG. 8.

If the magazine 12 is supposed to be removed from the housing 10, then the robot unit 14 is moved towards the back in the open space as illustrated by an arrow in FIG. 8. The gripper device 18 is moved to the height at which the snap arm 30 of the magazine 12 to be unlocked is present. If the robot unit 14 arrives at the end of the travel path, then the gripper device 18 is swiveled towards the magazine 12 as illustrated in FIG. 9. The gripper device 18 thus hits against an actuating lever 36 of the snap arm 30 and thus swivels the snap arm 30 against the force of the spring 32 so that the snap arm 30 is lifted out of the catching recess 34 of the magazine 12, as illustrated in FIG. 9. The magazine can now be pulled out of the housing 10 in the direction illustrated by an arrow in FIG. 9.

By adjusting the height of the gripper device 18 it is possible to select that magazine among those located on top of one another, which is supposed to be unlocked. By swiveling the gripper device 18 towards the left, the magazines 12 on the left side can be unlocked as shown in the FIGS. 8 and 9. By a corresponding swivel of the gripper device 18 towards the right, the mirror-symmetrically designed locks of the magazines 12 on the right side can be unlocked.

If the magazines 12 located opposite to one another on the left and the right side are supposed to be unlocked simultaneously, then the gripper device 18 can remain in its central position so that it simultaneously hits against the actuating lever 36 of both the opposing magazines 12 in order to unlock the respective snap arm 30 on both the sides.

If the magazines 12 located on top of one another are supposed to be unlocked simultaneously, then a vertically continuous snap arm engaging with all the magazines 12 arranged on top of one another can be used instead of one snap arm 30 assigned to each individual magazine. Alternatively, the snap arms 30 of the magazines arranged on top of one another are joined non-rotatably to one another about their swivel axis.

Other locking and unlocking mechanisms will become obvious to those of skill in the art. Such locking and unlocking mechanisms can be designed mechanically in a modified form and be operated mechanically. Likewise, unlocking mechanisms using proximity sensors or optical sensors are possible, which are operated by the robot unit 14.

The drawer of the changing device 28 is also preferably locked in the inserted position in the associated magazine 12. The process of unlocking and extending the changing device 28 is illustrated in the FIGS. 10 and 11.

A pressure strip 38 is molded on the changing device 28, which pressure strip is supported using a spring 40 in the magazine 12. Furthermore, a locking bar 42 is arranged in the magazine 12, which locking bar is mounted so as to be displaced transversely to the pull-out direction of the change receptacle 28. A blocking plate 44 is attached to the locking bar 42. The locking bar 42 is pre-stressed by a spring 46 and pressed into a locking position in which the locking bar 42 protrudes from the magazine 12 into the open space in which the robot unit 14 is arranged.

Figure 10:
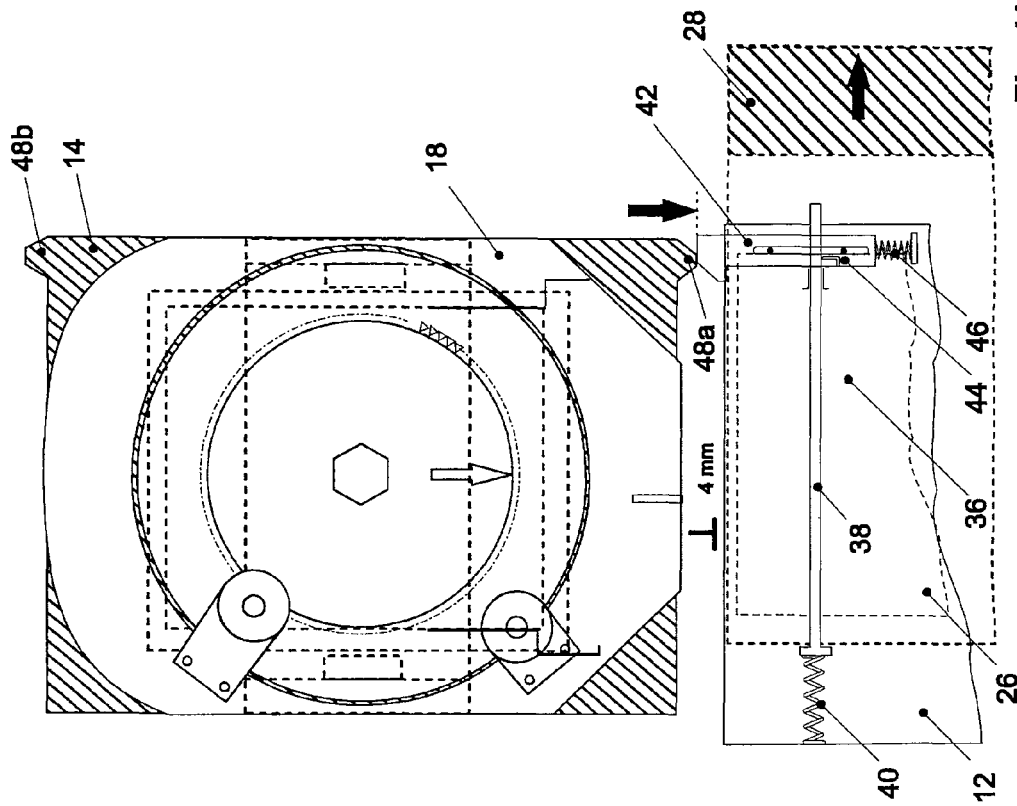
FIG. 10 is a plan view of the change receptacle in the locked position and FIG. 11 is an illustration corresponding to FIG. 10 with an unlocked change receptacle.
Figure 11:
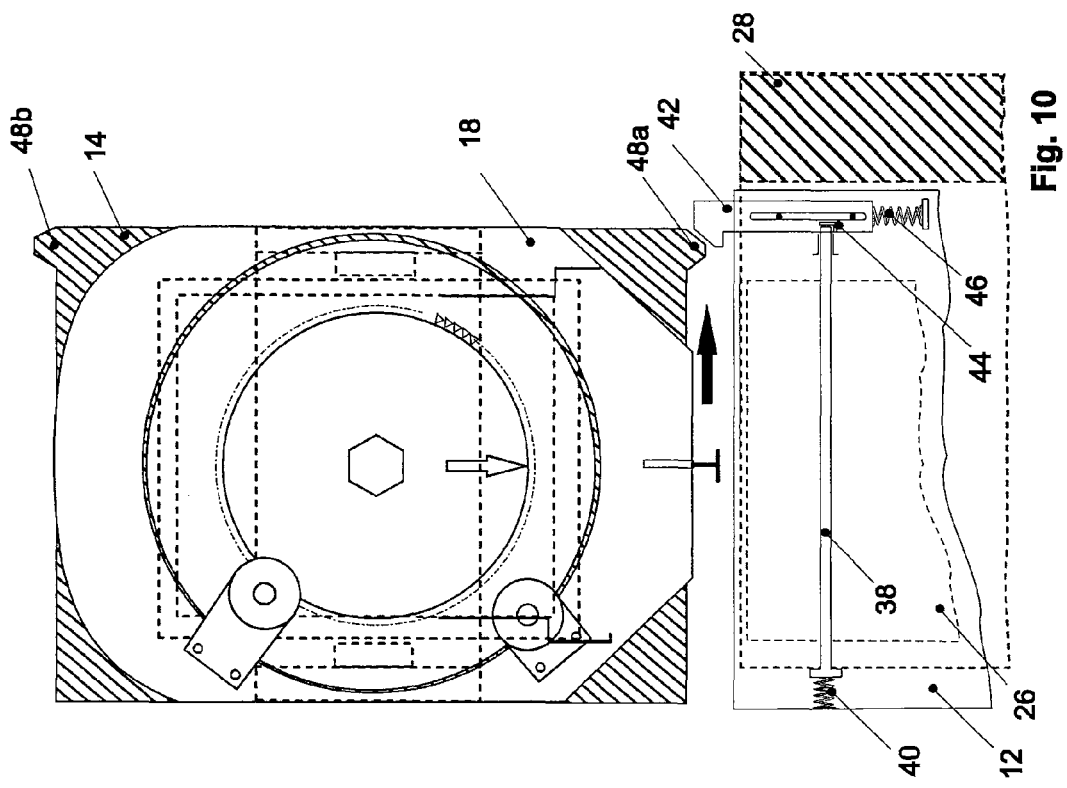

FIG. 10 shows the locking position of the changing device 28 inserted into the magazine 12. The locking bar 42 is pushed by the spring 46 into the locking position in which it protrudes into the open space. The pressure strip 38 molded on the changing device 28 is inserted together with the changing device 28 into the magazine 12, by which the spring 40 is compressed and stressed. The blocking plate 44 blocks the pressure strip 38 and prevents the spring 40 from pressing the changing device 28 out of the magazine 12 by means of the pressure strip 38.

The robot unit 14 can travel up to a front end position, in which the gripper device 18 is aligned with the receiving slot 22 of the changing device 28 locked in its operating position, as indicated by the markings in FIG. 10. The robot unit 14 with its gripper devices 18 can thus remove cartridges from and insert them into the changing devices 28.

If the changing device 28 is supposed to be unlocked, then the robot unit 14 is moved beyond the front end position shown in FIG. 10 against the front side of the housing 10, as indicated by an arrow in FIG. 10. In this movement, the robot unit 14 comes to a stop position with a chamfered unlocking projection 48a against a chamfer of the locking bar 42, by which the locking bar 42 is pressed into the magazine 12 against the force of the spring 46. In this movement (indicated by an arrow in FIG. 11) of the locking bar 42, the blocking plate 44 attached to the locking bar 42 releases the pressure strip 38, so that the spring 40 can push the changing device 28 by means of the pressure strip 38 out of the magazine 12 in the arrow direction shown in FIG. 1 [sic; 11].

If the changing device 28 is pushed again into the magazine 12 after the cartridge is changed, then the pressure strip 38 stresses the spring 40 again. If the changing device 28 is completely inserted, the blocking plate 44 can engage behind the pressure strip 38 again and the locking bar 42 is pushed again into the open space by the spring 46 so that the changing device 28 is locked again.

An unlocking projection 48b arranged on the robot unit 14 mirror-symmetrically to the unlocking projection 48a, serves for unlocking the mirror-symmetrically designed locking mechanism of the magazine on the right side. In the case of each of the upper magazines 12, a corresponding locking mechanism of the changing device 28 can be provided, which locking mechanism can be unlocked in a corresponding manner, e.g. by means of the gripper device 18 of the robot unit 14.

Here also, other locking and unlocking mechanisms of the changing device 28 that are familiar to those of skill in the art are also possible in the magazine 12 within the scope of the invention.

What is claimed is:

1. A device for storing data carriers, comprising a housing, with at least one magazine, which can be inserted into the housing and which can be removed from the housing, with receptacles arranged in the magazine, each of said receptacles being used for a data carrier and with a robot unit, which can move in the housing and can be positioned in front of the receptacles of the at least one magazine, in order to remove the data carriers out of the receptacles or to insert them into the receptacles, a changing device being arranged at the end of the at least one magazine, which changing device is accessible from the outer side of the housing when the magazine is inserted, in order to remove a data carrier from this changing device and/or to insert a data carrier into this changing device, wherein the data carriers are accommodated lying flat in the receptacles of the magazine and the changing device is designed as a drawer, which is mounted in the magazine with at least one receptacle and which, in the case of the inserted magazine, can be extended out of the magazine and the housing in a plane parallel to that of the receptacles into a change position in which data carriers can be removed from and/or inserted into the housing.

2. The device according to claim 1, wherein the at least one magazine is designed with horizontally arranged receptacles and can be inserted into the housing perpendicularly to a vertical front side of the housing.

3. The device according to claim 1, wherein magazines are arranged on both sides of the housing, said sides being located perpendicularly to the front side of the housing, and the robot unit can move in an open space between the magazines located on both sides.

4. The device according to claim 1, wherein at least two magazines having receptacles disposed in parallel horizontal levels are arranged on top of one another in the housing.

5. The device according to claim 1, wherein the robot unit has a gripper device, which is height-adjustable, in order to be positioned in front of the receptacles in levels arranged on top of each other, and which can be swiveled in a plane parallel to the receptacles, in order to be positioned in front of the receptacles of the magazines arranged on opposing sides of the housing.

6. The device according to claim 1, wherein the magazines can be locked in the inserted state in the housing.

7. The device according to claim 6, wherein the locking mechanism of the magazines can be unlocked by means of the robot unit.

8. The device according to claim 7, wherein the locking mechanism comprises a snap arm, which, being spring-loaded, snaps into position in a catching recess of the magazine and the snap arm is lifted by the robot unit out of the catching recess against the spring force.

9. The device according to claim 1, wherein the at least one changing device can be locked in the magazine in the inserted position.

10. The device according to claim 9, wherein the locking mechanism of the changing device can be unlocked by the robot unit.

11. The device according to claim 10, wherein the robot unit can be moved beyond an operating position in which it is positioned in front of the changing device locked in the magazine for delivering a data carrier in order to unlock the locking mechanism of the changing device.

12. The device according to claim 11, wherein the locking mechanism of the changing device comprises a locking bar, which is mounted in the magazine and which holds the changing device in the magazine against a spring force and that the locking bar is moved by the robot unit out of the locking position into a release position in which the locking bar does not hold the changing device so that the latter, loaded by the spring, is pushed out of the magazine.

13. A device for storing data carriers, comprising
a housing comprising at least one magazine,
receptacles arranged in the magazine, each of said receptacles being used for a data carrier, wherein the data carriers are accommodated lying flat in the receptacles of the magazine, and
a robot unit, designed to move in the housing and to be positioned in front of the receptacles of the at least one magazine, in order to remove the data carriers out of the receptacles or to insert them into the receptacles,
a changing device being arranged at the end of the at least one magazine, the changing device being accessible from the outer side of the housing when the magazine is inserted, in order to remove a data carrier from this changing device an/or to insert a data carrier into this changing device, wherein the changing device is designed as a drawer, which is mounted in the magazine with at least one receptacle and which, in the case of the inserted magazine, can be extended out of the magazine and the housing in a plane parallel to that of the receptacles into a change position in which data carriers can be removed from and/or inserted into the housing.

14. A device for storing data carriers, comprising
a housing comprising at least one magazine,
receptacles arranged in the magazine, each of said receptacles being used for a data carrier, wherein the data carriers are accommodated lying flat in the receptacles of the magazine, and
a robot unit, designed to move in the housing and to be positioned in front of the receptacles of the at least one magazine, in order to remove the data carriers out of the receptacles or to insert them into the receptacles,
a changing device being arranged at the end of the at least one magazine, the changing device being accessible from the outer side of the housing when the magazine is inserted, in order to remove a data carrier from this changing device and/or to insert a data carrier into this changing device, wherein the changing device is designed as a drawer, which is mounted in the magazine with at least one receptacle and which, in the case of the inserted magazine, can be extended out of the magazine and the housing in a plane parallel to that of the receptacles into a change position in which data carriers can be removed from and/or inserted into the housing, wherein
the at least one magazine is designed with horizontally arranged receptacles and can be inserted into the housing perpendicularly to a vertical front side of the housing.

15. The device according to claim 14, wherein magazines are arranged on both sides of the housing, said sides being located perpendicularly to the front side of the housing, and the robot unit can move in an open space between the magazines located on both sides.

16. The device according to claim 14, wherein the robot unit has a gripper device, which is height-adjustable, in order to be positioned in front of the receptacles in levels arranged on top of each other, and which can be swiveled in a plane parallel to the receptacles, in order to be positioned in front of the receptacles of the magazines arranged on opposing sides of the housing.

17. The device according to claim 14, wherein the at least one changing device can be locked in the magazine in the inserted position.

18. The device according to claim 17, wherein the locking mechanism of the changing device can be unlocked by the robot unit.

19. The device according to claim 18, wherein the robot unit can be moved beyond an operating position in which it is positioned in front of the changing device locked in the magazine for delivering a data carrier in order to unlock the locking mechanism of the changing device.

20. The device according to claim 19, wherein the locking mechanism of the changing device comprises a locking bar, which is mounted in the magazine and which holds the changing device in the magazine against a spring force and that the locking bar is moved by the robot unit out of the locking position into a release position in which the locking bar does not hold the changing device so that the latter, loaded by the spring, is pushed out of the magazine.

* * * * *